Jan. 22, 1963 E. C. HUEBSCHMANN 3,074,280
ACCELEROMETER USING MAGNETIC TORSION
Filed Jan. 25, 1960 3 Sheets-Sheet 1

INVENTOR.
EUGENE C. HUEBSCHMANN
BY
ATTORNEY
AGENT

Jan. 22, 1963     E. C. HUEBSCHMANN     3,074,280
ACCELEROMETER USING MAGNETIC TORSION

Filed Jan. 25, 1960     3 Sheets-Sheet 2

INVENTOR.
EUGENE C. HUEBSCHMANN
BY
ATTORNEY
AGENT

United States Patent Office 3,074,280
Patented Jan. 22, 1963

---

3,074,280
ACCELEROMETER USING MAGNETIC TORSION
Eugene C. Huebschmann, Dayton, Ohio, assignor to the United States of America as represented by the Secretary of the Air Force
Filed Jan. 25, 1960, Ser. No. 4,584
5 Claims. (Cl. 73—517)
(Granted under Title 35, U.S. Code (1952), sec. 266)

The invention described herein may be manufactured and used by or for the United States Government for governmental purposes without payment to me of any royalty thereon.

This invention relates to an accelerometer for measuring very small accelerations.

One object of the invention is to provide an accelerometer capable of sensing much smaller accelerations than prior art devices.

Another object is to provide an accelerometer for measuring small accelerations which is inexpensive to construct and operate.

Another object is to provide an accelerometer, for measuring small accelerations, which is small in size.

A further object is to provide an accelerometer wherein the range of operation may be very readily changed.

These and other objects will be more fully understood from the following detailed description taken with the drawing wherein FIG. 1 shows an accelerometer according to one embodiment of the invention;

There are many devices in the prior art which are capable of indicating large accelerations but it has been found to be very difficult to provide systems for obtaining small accelerations such as might occur in the drifting of a missile from its desired path. Though some have been built they have been very bulky and costly. According to this invention, an accelerometer is provided which is capable of measuring very small acceleration and, at the same time, is simple in construction, small in size and capable of adjusting, either manually or automatically, to different ranges of operation.

The device of the invention obtains its acceleration indication by first causing a mirror supported by two wires located within a magnetic field to be twisted a predetermined amount by passing a predetermined current from a constant current source through the wires and then by measuring the amount that the wires are untwisted by the inertia of a mass when an acceleration takes place.

Figure 1:
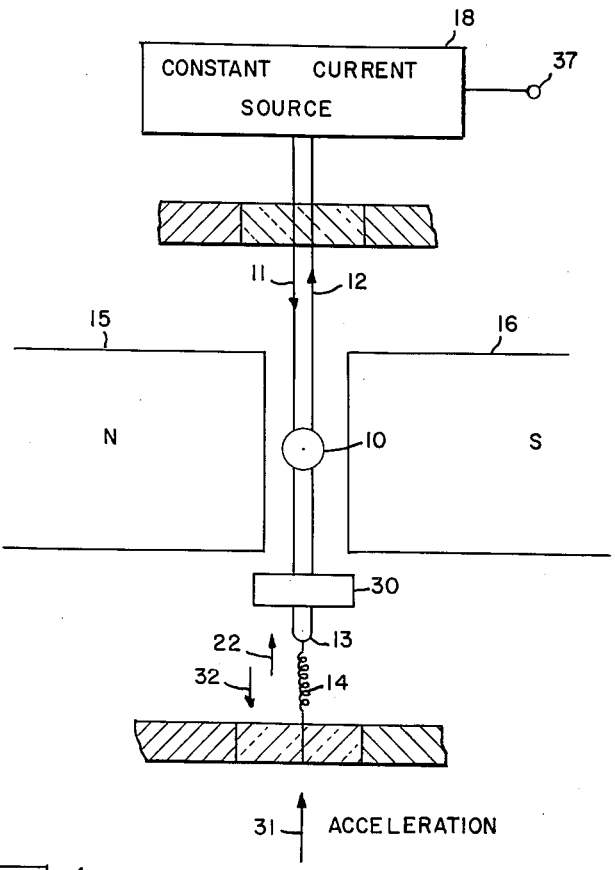
Figure 2:
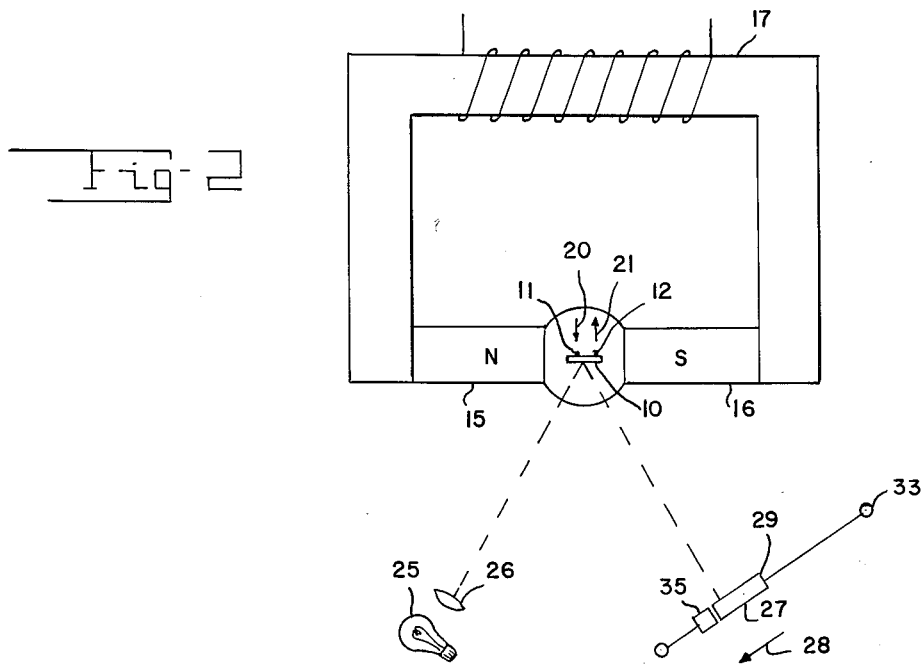
FIG. 2 shows the optical system used with the device of FIG. 1 to obtain the acceleration indication.

Referring more particularly to FIG. 1 of the drawing reference number 10 refers to a mirror supported by two wires 11 and 12. The wires close in a loop 13 and are held in tension by a spring 14. A magnetic field is caused to flow between pole pieces 15 and 16 by an electromagnet 17 as shown in FIG. 2. It is obvious that a permanent magnet could by substituted for the electromagnet 17 if desired. With a current supplied to wires 11 and 12 from a constant current source 18, in the direction shown, the wires will move in the directions shown by the arrows 20 and 21 in FIG. 2, which will twist wires 11 and 12 and will move loop 13 in the direction shown by arrow 22.

As shown in FIG. 2 a light from light source 25 is focused onto the mirror 10 by a lens 26. The reflected light impinges upon a sensing device 27 which may be a series of photomultipliers which produce an increasing output in the direction shown by the arrow 28.

The current supplied to wires 11 and 12 should be just sufficient to cause the reflected light to impinge on the edge 29 of the sensing device.

A mass 30 is secured to the wires 11 and 12. With an acceleration in the direction of arrow 31 the inertia of mass 30 will provide a relative movement of loop 13 in the direction shown by arrow 32 which will cause wires 11 and 12 to move in the direction opposite to that shown by arrows 20 and 21 and will thus produce an output at 33 as determined by the position of the light on sensing device 27. The only force that the inertia of the mass 30 has to overcome to produce an acceleration output signal at 33 is the force due to the flow of current in the wires in a magnetic field. Thus very accurate acceleration indications can be obtained. A sensing device 35 may be provided to produce a control signal which may be applied to terminal 37 in FIG. 1 to reset the current in constant current device 18 when the light moves off of sensing device 27.

Figure 4:
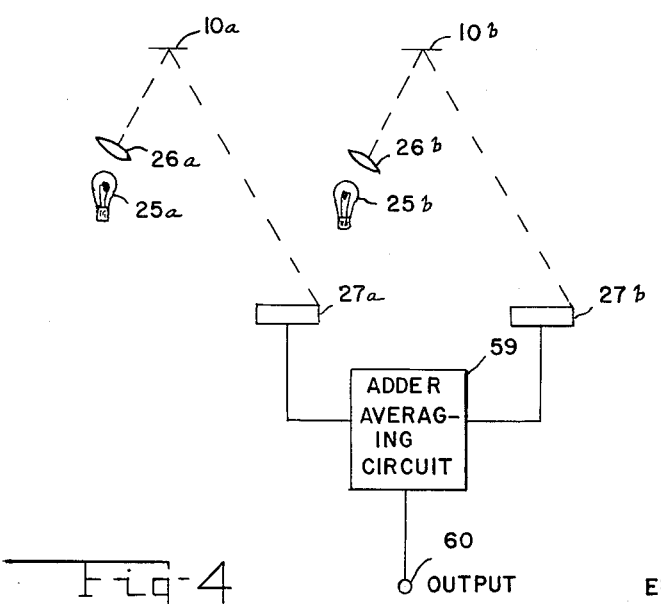
FIG. 4 is a schematic showing of the output for the device of FIG. 3.
Figure 3:
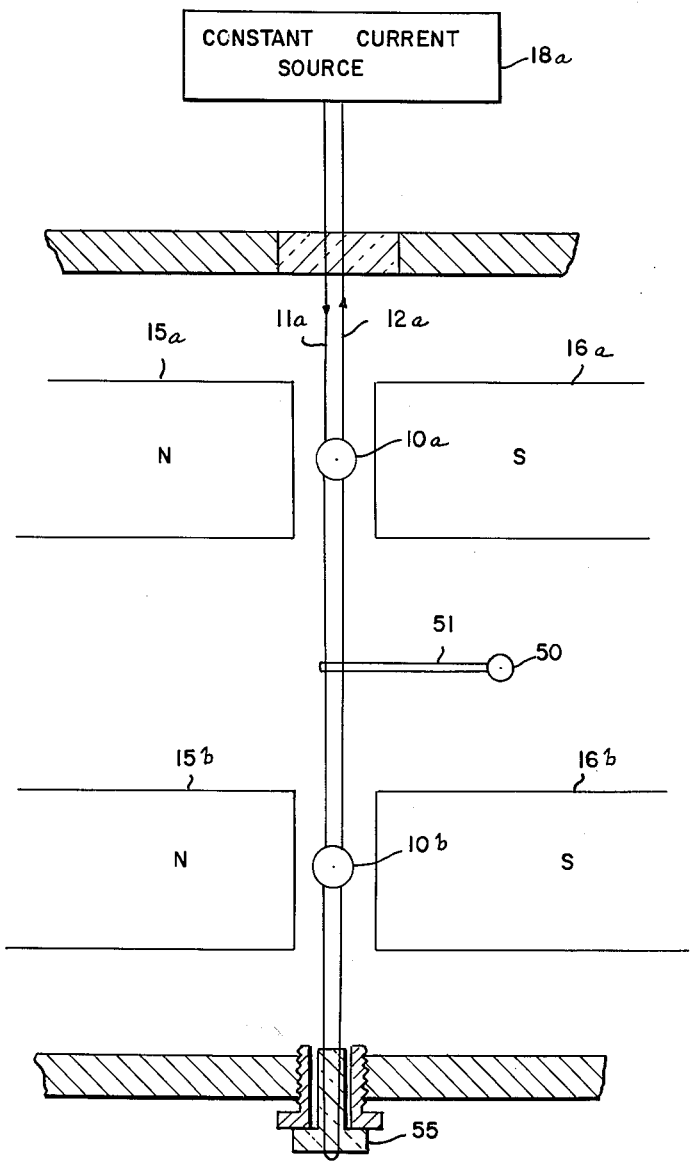
FIG. 3 shows a further modification of the accelerometer according to the invention.

In the device of FIG. 3 current from constant current source 18a is made to flow through conductors 11a and 12a which pass through the magnetic field owing between magnetic poles 15a, 16a and 15b, 16b, which causes the wires to turn the same as wires 11 and 12 in FIG. 2. A mass 50 supported on a lever arm 51 produces a counter torque when the device is accelerated in a direction into the the paper. A tensioning device 55 is provided to obtain the proper tension on the wires. An output is obtained from mirrors 10a and 10b in the manner shown in FIG. 4. The outputs from devices 27a and 27b are added together in the adder and averaging circuit 59 to provide an output at 60. The double set of pole pieces are provided to give balanced torque on the sides of the mass 50. It is obvious that devices similar to 35 in FIG. 2 could be used with the device of FIGS. 3 and 4.

There is thus provided a device capable of measuring very small accelerations.

Though certain specific embodiments have been described in some detail it is obvious that numerous changes may be made without departing from the general principles and scope of the invention.

I claim:

1. A device for measuring very small accelerations, comprising; means for providing a magnetic field, a pair of wires passing through said magnetic field with the plane of said wires in their undeflected position being parallel to said magnetic field, said wires ending in a loop connecting them together, means for holding said wires under tension, means for passing a constant current through said wires to thereby produce a turning force on said wires, means supported on said wires for opposing said turning force when the device is subjected to an acceleration, a mirror supported on said wires, a sensing device located in light energy receiving relation to said mirror and means for directing a beam of light toward said mirror for reflection toward said sensing device to thereby produce an output in said sensing device proportional to the deflected position of said mirror.

2. A device for measuring very small accelerations, comprising; means for providing a magnetic field, a pair of wires passing through said magnetic field with the plane of said wires in their undeflected position being parallel to said magnetic field, said wires ending in a loop connecting them together, means for holding said wires under tension, means for passing a constant current through said wires to thereby produce a turning force on said wires, a mass supported on said wires between said magnetic field producing means and said tensioning means for opposing said turning force when the accelerator is subjected to an acceleration in a direction away from said tensioning means, a mirror supported on said wires, a sensing device located in light energy receiving relation to said mirror and means for directing a beam of light toward said mirror for reflection toward said sensing device to thereby produce on output in said sensing device proportional to the deflected position of said mirror.

3. A device for measuring very small accelerations, comprising; means for providing a magnetic field, a pair of wires passing through said magnetic field with the plane of said wires in their undeflected position being parallel to said magnetic field, said wires ending in a loop connecting them together, means for holding said wires under tension, means for passing a constant current through said wires to thereby produce a turning force on said wires, a mass supported on said wires for opposing said turning force when the accelerator is subjected to an acceleration, a mirror supported on said wires, a sensing device located in light energy receiving relation to said mirror, means for directing a beam of light toward said mirror for reflection toward said sensing device to thereby produce an output from said sensing device proportional to the deflected position of said mirror and means adjacent said sensing means for resetting the constant current device when the deflection due to said acceleration reaches a predetermined amount.

4. A device for measuring very small accelerations, comprising; means for providing a magnetic field, a pair of wires passing through said magnetic field with the plane of said wires in their undeflected position being parallel to said magnetic field, said wires ending in a loop connecting them together, means for holding said wires under tension, means for passing a constant current through said wires to thereby produce a turning force on said wires, a lever arm extending perpendicular to said wires supported on said wires, a mass supported on said lever arm for opposing said turning force when the device is subjected to an acceleration in a direction perpendicular to said lever arm and said wires, a mirror supported on said wires, a sensing device located in light energy receiving relation to said mirror and means for directing a beam of light toward said mirror for reflection toward said sensing device to thereby produce an output in said sensing device proportional to the deflected position of said mirror.

5. A device for measuring very small accelerations, comprising; means for providing a first and a second magnetic field, a pair of wires passing through said magnetic fields with the plane of said wires in their undeflected position being parallel to said magnetic fields, said wires ending in a loop connecting them together, means for holding said wires under tension, means for passing a constant current through said wires to thereby produce a turning force on said wires, a lever arm supported on said wires between said two magnetic field producing means, said lever arm extending in a direction perpendicular to said wires, a mass supported on said lever arm for opposing said turning force when the device is subjected to an acceleration in a direction perpendicular to said lever arm and said wires, a pair of mirrors supported on said wires, one of said mirrors being connected to said wires adjacent said first magnetic field producing means and the other said mirror being connected to said wires adjacent said second magnetic field producing means, a sensing device located in light energy receiving relation to each of said mirrors, means for directing a beam of light toward each of said mirrors for reflection toward said sensing devices to thereby produce an output in said sensing devices proportional to the deflected position of said mirrors and means for producing an output proportional to the average of the outputs of said sensing devices.

References Cited in the file of this patent
UNITED STATES PATENTS

| | | |
|---|---|---|
| 1,552,186 | Anderson | Sept. 1, 1925 |
| 2,873,103 | Haulty | Feb. 10, 1959 |